Oct. 24, 1967 R. M. STANTON 3,349,001
MOLTEN METAL PROTON TARGET ASSEMBLY
Filed July 22, 1966
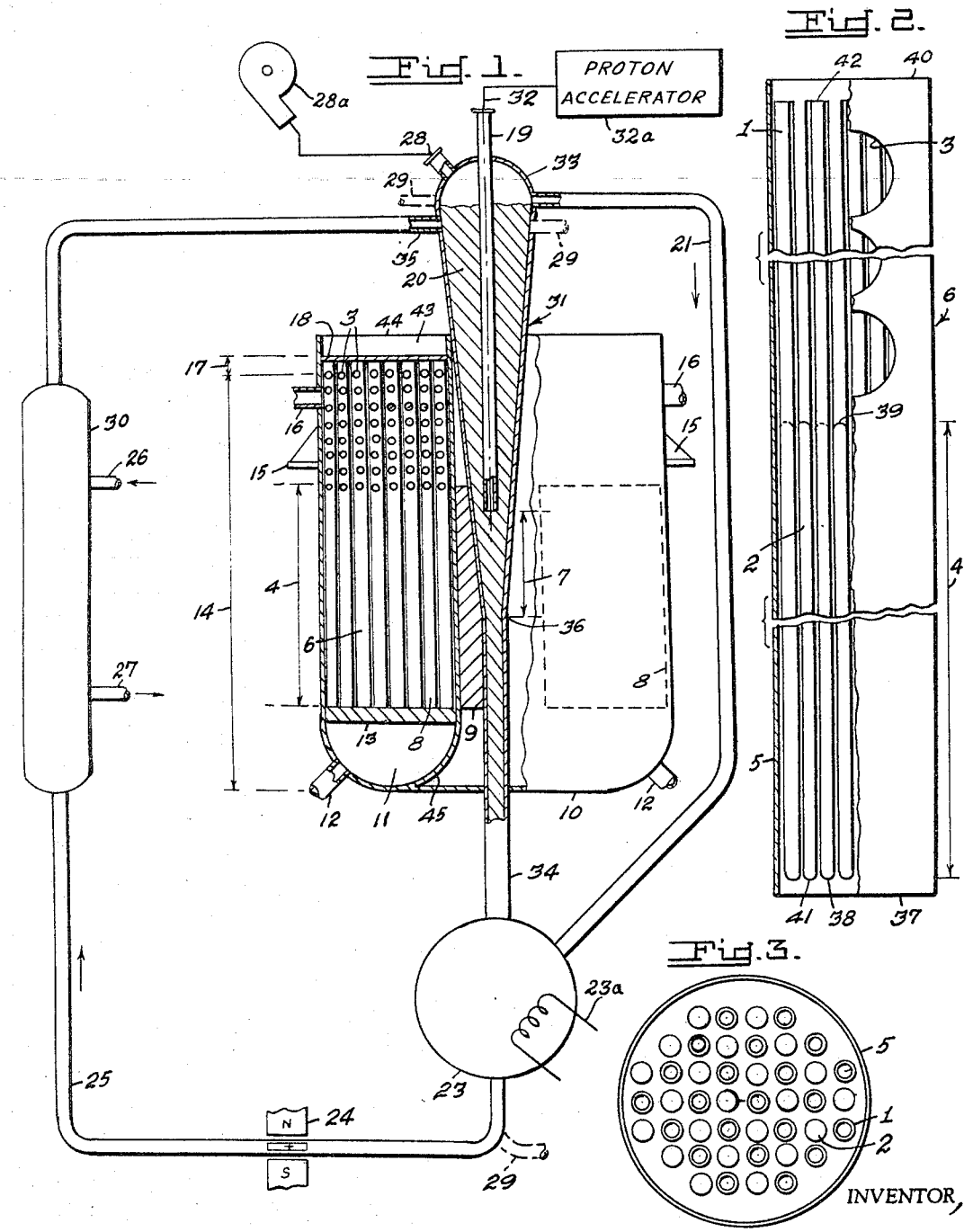
INVENTOR,
Richard Myles Stanton
BY: Harry M. Saragovitz,
Edward J. Kelly &
Herbert Berl
ATTORNEYS.

United States Patent Office 3,349,001
Patented Oct. 24, 1967

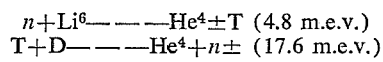

3,349,001
MOLTEN METAL PROTON TARGET ASSEMBLY
Richard Myles Stanton, Canton, Mass., assignor to the United States of America as represented by the Secretary of the Army
Filed July 22, 1966, Ser. No. 567,161
7 Claims. (Cl. 176—11)

ABSTRACT OF THE DISCLOSURE

A thermal nuclear apparatus having a molten metal proton target surrounded by a blanket of fertile material and a recirculating coolant. The molten metal passes through the assembly providing a changing exposure to accelerated protons for the generation of spallation neutrons.

---

The invention described herein may be manufactured and used by or for the Government, for governmental purposes, without the payment to me of any royalties thereon.

The present invention relates to accelerated nuclear particle targets; and more particularly to a molten metal proton target assembly.

It is desirable to have a target for accelerated particles that possess utility beyond providing a material for physical or chemical conversion by the incident particles. The instant invention bridges the gap between the cumbersome fission reactors and the unipurpose particle targets taught by the prior art. It utilizes some principles common to both and offers performance superior to either.

Briefly, the device of the invention resides in a fluid, accelerated-particle target surrounded by fertile nuclear material; with provisions for bombardment of the target by a beam of accelerated nuclear particles and for coolant means to extract heat generated within the blanket of fertile nuclear material. The gravamen of the invention lies in the target, which in the preferred embodiment consists of molten metal in a state of steady flow through the assembly. A proton beam, for example, impinges directly on the molten metal, initiating the nuclear reaction discused in more detail below.

A target assembly like the one herein presented has two functions. It can be utilized as a neutron generator in a system containing a conventional homogeneous fission reactor, a heat exchanger, a steam-electric plant, and a particle accelerator; or it can be employed without the first named component. By proper design, the heat release rate of the subject invention is sufficient to conceivably eliminate the need for the nuclear reactor. All the energy necessary to operate the steam-electric plant, to overcome system losses, and to generate a useful net output of electric power comes principally from the blanket of fertile breeding material within the target assembly. The thermal output of the tested embodiment of the instant device was approximately 250 megawatts-thermal.

As designed, the target assembly utilizes molten lead or a lead-bismuth eutectic for the target material; a one b.e.v. proton beam for the accelerated charged particle requirement (although deuterons or alpha particles may be used—with less efficient results); and a uniquely arranged combination of lithium deuteride and the oxides of thorium-232 and natural uranium-238 (oxides of depleted or spent thorium-232 or uranium-238 or a combination of any of these may also be used depending on the desired degree of activity) for the breeding blanket. Liquid sodium or sodium-potassium eutectic is employed as a coolant. Additionally, a "booster" of beryllium oxide may be employed as an inner blanket material when a greater activity is desired.

When accelerated protons strike the target, high energy spallation neutrons are produced. The yield with a 1 b.e.v. proton beam is 25 neutrons per proton. With 65 milliamperes of proton beam, $10^{19}$ spallation neutrons per second are produced. The same result obtains with molten lead or with lead-bismuth eutectic. Of particular note is the role played by the lithium deuteride when it is contacted by the generated neutrons. A pair of exoergic reactions occur:

$$n + Li^6 \longrightarrow He^4 \pm T \ (4.8 \text{ m.e.v.})$$
$$T + D \longrightarrow He^4 + n \pm \ (17.6 \text{ m.e.v.})$$

In the subject invention, if a solution of lithium deuteride diluted in the $Li^6$ fraction to a point of 0.1 cm.$^{-1}$ macroscopic absorption cross-section for thermal neutrons is used, the ratio of thermal neutrons absorbed to fast neutrons produced is 1.5 to 1. Thermal energy from these reactions may be employed also for heat production. And the high energy portion of the fission neutron spectrum is improved by the supplemental high energy neutrons produced above; there occurs a marked increase in fast neutron flux at the 14 m.e.v. energy level. Increased concentrations of lithium deuteride, up to and including purity, account for more fusion reactions and thereby result in a still higher yield of fast neutrons. The thorium-232 and uranium-238 augment and improve total neutron production by releasing four or five neutrons for every 14 m.e.v. neutron absorbed. The entire process is sustained by the neutrons from the lead target.

It is the primary object of the present invention to provide an accelerated particle target assembly for producing spallation neutrons.

It is a further object to provide a target assembly capable of generating large quantities of heat.

It is still another object to provide a means for isotope experimentation.

It is a final object to provide a target assembly capable of maintaining a fast energy neutron spectrum and inducing fusion in its fertile nuclear material blanket.

These and other objects and advantages of the present invention will be fully apparent from the following description taken in connection with the annexed drawing, in which:

FIGURE 1 is an elevation view, partly in section, of the target assembly and its heat exchanger;

FIGURE 2 is an elevation view, partly in section, of a cylindrical element in the fertile blanket; and FIGURE 3 is an enlarged top view of FIGURE 2.

The target assembly is contained in a housing 10 supported by brackets 15. Centrally arranged within the housing 10 is a fluid transition column 31 which feeds molten metal 20 through the assembly. A proton guide tube 19 runs longitudinally through the center of the hollow transition column 31 terminating in the vicinity of the center of the housing 10. The guide tube 19 is evacuated; nothing prevents the direct impingement of the accelerated proton 32 on the molten metal target 20. If the target is gas, a small membrane or "window" is add to the end of the guide tube 19 immersed in the target to prevent the gas from entering the tube. This requirement is obviated when molten metal is employed. The absence of the membrane simplifies construction, prevents vapor pressure accumulation within the transition column, and permits a pumping or aspirator action on the part of the liquid metal which promotes the vacuum in the guide tube 19. Further, direct impingement insures more efficient proton absorption and neutron production. The weight of the molten metal prevents its entering the evacuated tube.

The fluid transition column 31 is tapered, with a dome at its upper end 33 and a tube 34 at its lower end. The proton tube 19 enters the domed end. Convergence to a narrow channel occurs in the vicinity of the center 36 of the housing 10 at a point below the open, lower end of the proton guide tube 19. This volume of molten metal forms the effective target area 7. The effective target 7, in turn, is always at the center of the breeding blanket core 8, described below. Recirculating means are provided for the molten metal 20. The metal enters the transition column 31 through inlet pipe 35, and flows by gravity down the column 31, around the guide tube 19, into a sump 23 located at the lowest point in the system, through an electromagnetic pump 24, up a discharge riser 25, through a liquid metal heat exchanger 30, and back into the inlet pipe 35. Overflow in the transition column 31 is removed from the dome 33 by a downcomer 21 which delivers the overflow to the spherical sump 23. Gases released by the molten metal are removed through the dome 33 of the column 31 by an out-gasser 28 which leads to an externally disposed vacuum pump 28a. Any vapor generated as the metal 20 flows down the column 31 is condensed on the cooler surface of the proton guide tube 19 and comes to equilibrium with the new environment. In addition to behaving as a flow stabilizing device, the transition column 31 acts as a "cold trap" for metal vapor that might otherwise find its way back into the proton guide tube 19.

That no valves or other flow obstructions are necessary is an important feature of the instant invention. If the proton beam were interrupted, the electromagnetic pump would shut off automatically; resulting in solidification of the metal target material throughout the system, if any obstructions were extant. As designed, however, the liquid metal drains by gravity into the sump 23 which, at the lowest point in the system, forms a reservoir. Equipped with heating means 23a, the sump 23 can remelt the accumulated metal preparatory to recirculation.

Another feature of the target assembly as presented is its axial symmetry, permitting additional downcomers and risers 29. A multiplicity of these inlets and outlets allows the use of lighter weight components—heat exchangers, connecting piping, and the like. Additionally, several electromagnetic pumps of more manageable size can be employed in lieu of the relatively large one 24 used in the present embodiment. One advantage of less massive components is that they are less susceptible to thermal shock stresses caused by the start and stop of the circulating metal; resulting in an increased life for the system.

Maintenance of a relatively small, but steady overflow from the dome 33 of the transition column 31 establishes a fixed static head on the vertical column of flowing metal 20. In that manner, the exposed, moving target presents a uniform and controllable volume of metal for the production of spallation neutrons at all times. The height, diameter, and taper of the transition column 31 can be freely chosen to obtain a desired velocity or mass flow of the target 7.

The composition and orientation of the breeding blanket 8 presents novel subject matter also. Contained within several closed, vertically oriented cylindrical tanks 45 is a plurality of open ended cylindrical elements 6 each in turn possessing a shell 5, and a plurality of vertical, symmetrically arranged tubes 1, 2. The tubes are of two types: sealed tubes 2 containing the fertile nuclear material and considerably shorter than the cylindrical shell 5 and alternate vented tubes 1 slightly shorter than the cylindrical shell 5 and containing lithium deuteride. The lower ends 38, 41 of all the tubes 1, 2 are recessed from the lower end 37 of their respective cylindrical shells 5. According to the respective length of the tubes 1, 2 their upper ends 39, 42 are either slightly recessed from the upper end 40 of their respective cylindrical shells 5 or considerably lower. The shorter height 4 of the sealed tubes 2 defines the height of the breeding blanket core 8. Accordingly, the vented tubes 1 are filled with lithium deuteride to a height commensurate with the height of the sealed tubes 2. If a "booster" of beryllium oxide 9 is used, it is arranged immediately around the transition column 31.

Between its upper end 40 and a point immediately above the upper end 39 of the sealed tubes 2, each cylindrical element 6 has a single line of spaced apertures 3 in its shell 5. (As will be described below, coolant exits through these openings.) Spaced from the top 44 of the cylindrical tank 45, the cylindrical elements 6 are symmetrically arranged and suspended from an upper support grid 18 carried by the tank 45. The space 43 above the upper support grid is a gas collecting manifold for the helium gas generated as set forth above. The helium will form a blanket 17 of determinable depth. At their lower ends 37, the cylindrical elements 6 are positioned by, but not supported by, a foraminated grid 13 recessed from the bottom of the tank 45. As so arranged, the effective target area 7 lies in the center of the breeding core 8.

Coolant means take the form of two channel means from without the assembly to within the cylindrical tanks 45 containing the fertile material. One pipe 12 is located in the plenum formed by the bottom of the cylindrical tank 45 and the positioning grid 13, while the other 16 is located between the top of the breeding core 8 and the upper support grid 18. In operation, the coolant is externally pumped into pipe 12, through grid 13, into cylindrical elements 6, around the tubes 1, 2, to a height 14, and out of vent holes 3. From there the coolant exits from the assembly housing 10 by outlet 16, enters a liquid metal heat exchanger 30 through inlet 26 and returns to the target assembly through pipe 12 after quitting the heat exchanger 30 by pipe 27.

The operation of the device is substantially as follows: Accelerated protons 32 from an externally disposed accelerator 32a are guided by the proton tube 19 into the molten lead target 20 whereupon neutrons are generated. The generated neutrons pierce the booster 9, if used, thence through the blanket of fertile material 8 promoting nuclear reactions and the generation of heat therein. The coolant means carry off the generated heat through conduit 16 for ulterior purposes.

While preferred forms of the invention are shown and described, other forms of the invention are contemplated and numerous changes and modifications may be made therein without departing from the spirit of the invention as set forth in the appended claims.

What is claimed is:

1. A target assembly for accelerated nuclear particles comprising, a housing, conduit means running symmetrically through and carried by said housing, molten lead flowing through said conduit means, recirculating means connected to the ends of said conduit means for recycling said molten lead, tube means evacuated and longitudinally and symmetrically disposed within said conduit means from within said housing to an externally disposed particle accelerator, said tube means receiving and guiding a beam of accelerated nuclear particles emanating from said accelerator, containing means radially disposed around said conduit means within said housing, fertile nuclear material within said containing means, and coolant means passing through and in contact with said fertile material and carried by said housing, whereby said accelerated particle strikes the molten lead thereby emitting through nuclear reaction other nuclear particles which penetrate and react with the surrounding nuclear material causing additional nuclear reactions and generating heat.

2. The target assembly set forth in claim 1, including out-gassing means mounted on said conduit means and connected to an externally disposed vacuum pump to remove gas accumulated from said molten lead.

3. The target assembly set forth in claim 1, including overflow collecting means carried by said conduit means and leading to said recirculating means, whereby excess molten lead is prevented from entering said housing and is recirculated for later use.

4. The target assembly set forth in claim 1 wherein said conduit means are vertically oriented and tapered with the wider end above said housing and the narrower end within said housing, whereby the force of gravity aids in attaining a predetermined pressure-head on said molten lead.

5. The target assembly set forth in claim 1, wherein said containing means consists of a plurality of cylindrical tanks symmetrically arranged within said housing around said channel means with the longitudinal axes of said channel means and said tanks parallel, support means spaced from the upper ends of and mounted on the inner walls of said tanks, a plurality of open ended cylindrical elements symmetrically oriented within said tanks with the longitudinal axes of said elements and said tanks parallel, said elements being carried by said support means, a foraminated grid spaced from the bottoms of said tanks to position said cylindrical elements within said tanks, and a plurality of tubes mounted symmetrically within said cylindrical elements with the longitudinal axes of said tubes and said elements parallel, said tubes consisting of vented tubes containing lithium deuteride of length equal to said cylindrical elements and alternate sealed tubes containing uranium–238 of length less than said cylindrical elements, all of said tubes being mounted with one end adjacent one end of said cylindrical elements.

6. The target assembly set forth in claim 5, wherein said coolant means consist of liquid sodium coolant, conduit means carried by the walls of said housing and said tanks in the space between the end of said tank and said grid, second conduit means carried by the walls of said housing and said tanks in the space between the ends of said sealed tubes opposite said grid and said support means, said cylindrical elements having a longitudinal line of apertures in their walls in said second named space, whereby coolant pumped by an externally disposed pump enters the first named conduit means, flows around the tubes in the cylindrical elements, through the apertures in the walls of the cylindrical elements, and out the second named conduit means to an externally disposed heat exchanger.

7. The target assembly set forth in claim 1, including a blanket of beryllium oxide immediately surrounding said conduit means within said housing.

References Cited
UNITED STATES PATENTS

| | | | |
|---|---|---|---|
| 2,868,987 | 1/1959 | Salsig et al. | 176—14 |
| 2,933,442 | 4/1960 | Lawrence et al. | 176—11 |
| 2,993,851 | 7/1961 | Thomson et al. | 176—11 |
| 3,113,082 | 12/1963 | Imhoff et al. | 176—5 |

FOREIGN PATENTS 630,726  9/1949  Great Britain.

OTHER REFERENCES

AEC Document, AERE-R 3281, 1960, pp. 1–11, 17–19, Fig. 1.

AEC Document, CONF–650,217, 1965, pp. 73–81.

L. DEWAYNE RUTLEDGE, *Primary Examiner.*

CARL D. QUARFORTH, *Examiner.*

H. E. BEHREND, *Assistant Examiner.*